United States Patent
Kippel (10) Patent No.: US 12,454,910 B1
(45) Date of Patent: Oct. 28, 2025

(54) COMBINED CYCLE POWER PLANT WITH STEAM TURBINE BYPASS FOR SIMPLE CYCLE OPERATION WITH HEAT RECOVERY STEAM GENERATOR AND METHOD OF USE

(71) Applicant: GE Infrastructure Technology, LLC, Greenville, SC (US)

(72) Inventor: Bradly Aaron Kippel, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/789,883

(22) Filed: Jul. 31, 2024

(51) Int. Cl.
  *F02C 6/18* (2006.01)
  *F01K 23/10* (2006.01)

(52) U.S. Cl.
  CPC .............. *F02C 6/18* (2013.01); *F01K 23/10* (2013.01)

(58) Field of Classification Search
  CPC ................................. F02C 6/18; F01K 23/10
  See application file for complete search history.

(56) References Cited

U.S. PATENT DOCUMENTS

| | | | |
|---|---|---|---|
| 5,412,937 A * | 5/1995 | Tomlinson | F02C 7/18 60/39.182 |
| 5,428,950 A * | 7/1995 | Tomlinson | F02C 7/18 60/39.182 |
| 5,473,898 A * | 12/1995 | Briesch | F01K 23/10 60/656 |
| 8,365,537 B2 | 2/2013 | Li et al. | |
| 8,783,043 B2 * | 7/2014 | Bellows | F22B 37/22 60/39.182 |
| 2011/0006529 A1 * | 1/2011 | Rose | F01K 23/10 60/39.182 |
| 2015/0345387 A1 * | 12/2015 | Tobo | F01K 23/101 60/774 |
| 2017/0183980 A1 * | 6/2017 | Iida | F01K 23/101 |
| 2018/0010526 A1 * | 1/2018 | Mori | H02K 7/1823 |
| 2018/0058321 A1 * | 3/2018 | Yokoyama | F02C 3/04 |
| 2019/0024529 A1 * | 1/2019 | Kajihara | F02C 9/00 |
| 2019/0284963 A1 * | 9/2019 | Ngo | F01K 7/24 |
| 2020/0131990 A1 * | 4/2020 | Kippel | F02C 7/047 |
| 2021/0095579 A1 * | 4/2021 | Alzuraiqi | F01K 23/101 |
| 2021/0356129 A1 * | 11/2021 | Tanaka | F01N 3/0842 |

FOREIGN PATENT DOCUMENTS

| | | |
|---|---|---|
| EP | 2 423 469 A2 | 2/2012 |
| JP | 2010025108 A | 2/2010 |

* cited by examiner

*Primary Examiner* — William H Rodriguez
(74) *Attorney, Agent, or Firm* — Grogan, Tuccillo & Vanderleeden, LLP (57) ABSTRACT

A combined-cycle power plant with a steam turbine bypass for simple cycle operation with a heat recovery steam generator (HRSG) and a method of use are disclosed. In the disclosed combined-cycle power plant, a steam flow valving arrangement is operatively coupled with the steam turbine, the HRSG, and a condenser. The steam flow valving arrangement is configured to direct a flow of steam generated in the HRSG to the condenser bypassing the steam turbine during a simple cycle mode of operation. In addition, the steam flow valving arrangement is configured to direct the flow of steam generated in the HRSG to the steam turbine during a combined-cycle mode of operation.

14 Claims, 5 Drawing Sheets

COMBINED CYCLE POWER PLANT WITH STEAM TURBINE BYPASS FOR SIMPLE CYCLE OPERATION WITH HEAT RECOVERY STEAM GENERATOR AND METHOD OF USE

TECHNICAL FIELD

Embodiments of this disclosure relate generally to combined-cycle power plants and, more specifically, to a valving arrangement that allows a combined-cycle power plant (CCPP) to bypass a steam turbine system to perform a simple cycle operation that utilizes a gas turbine system and a heat recovery steam generator (HRSG) or that utilizes the steam turbine system with the gas turbine system and the HRSG to perform a combined-cycle operation, while being in emissions compliance for both operations.

BACKGROUND

In general, a CCPP includes a gas turbine system and a steam turbine system that work together to produce energy. The gas turbine system combusts a mixture of fuel with an air flow and directs it through a turbine to generate power. Exhaust from the gas turbine system can be used in the HRSG to create steam that is directed to the steam turbine system to generate power. Power plant operators can operate the gas turbine system in the CCPP in a simple cycle operation where only the gas turbine system is used to produce power or in a combined-cycle operation where the gas turbine system, the HRSG and the steam turbine system are used to produce power.

Currently, in order for a CCPP to operate alternately in a simple cycle mode of operation and a combined-cycle mode of operation, a diverter damper and bypass stack is required upstream of the HRSG. The diverter damper typically includes a single blade that can move to close off an outlet of the damper that directs the exhaust to the bypass stack or an outlet of the damper that directs the exhaust to the HRSG, depending on whether the gas turbine system is operating in the simple cycle mode or the combined-cycle mode. Generally, the bypass stack that is used for the simple cycle operation is not in emissions compliance. Since the simple cycle mode of operation is considered temporary due to a steam turbine trip, this operation is typically viewed as acceptable despite not being in emissions compliance. In order to meet constantly changing demands for electricity on power grids, more power plant operators are desiring that the gas turbine systems in CCPPs have the flexibility to operate in either the simple cycle mode of operation or the combined-cycle mode of operation and to remain in emissions compliance for both operations.

With currently available technology, a simple cycle operation can have emissions compliance by using a hot selective catalytic reduction (SCR) system with the diverter damper and bypass stack. Using a hot SCR system with the bypass stack has several drawbacks. For example, adding a hot SCR system to a diverter damper and bypass stack is not desirable because its implementation to a gas turbine system is a significant cost due to factors that can include the cost of the hot SCR system itself, the construction costs to implement the hot SCR system with the diverter damper and bypass stack, and the costs of adding other components so that the hot SCR system can operate properly. As an example, large ambient fans are generally added to cool the exhaust from the gas turbine system before it reaches the hot SCR system. To this extent, the fans can prevent unnecessary damage to parts of the SCR system that can arise from exhaust temperatures that exceed the SCR system's specified operating temperature limit. In addition, another drawback of adding a hot SCR system to a diverter damper and bypass stack is that the use of the hot SCR system has a large auxiliary load that will result in a lower net efficiency for the gas turbine system. Furthermore, deploying a hot SCR system to a diverter damper and bypass stack will significantly increase the overall footprint of the CCPP.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

In light of the drawbacks associated with adding a hot SCR system to a diverter damper and bypass stack, there is a need for another approach that can enable a CCPP to perform the simple cycle operation in emissions compliance, in addition to having the capability to perform the combined-cycle operation in emissions compliance.

The solution provided by the various embodiments to the technical problem of having a combined-cycle power plant perform both the simple cycle operation and the combined-cycle operation in emissions compliance entails using a steam flow valving arrangement in a CCPP, where the valving arrangement is operatively coupled with a steam turbine system, an HRSG, and a condenser. In one embodiment, during a simple cycle operation, the steam flow valving arrangement is configured to direct a flow of steam generated from the HRSG to the condenser and bypassing the steam turbine system. By routing the steam from the HRSG around the steam turbine system to the condenser where condensate from the steam is pumped back to the HRSG, the water in the heat exchanger tubes of the HRSG is prevented from overheating during the simple cycle operation. The steam flow valving is additionally configured to direct the flow of steam generated in the HRSG to the steam turbine system during a combined-cycle operation. In each of the configurations of the steam flow valving arrangement, the HRSG is utilized in both the simple cycle mode of operation and the combined-cycle mode of operation.

In one embodiment, the steam flow valving arrangement can include a three-way HRSG steam flow valve having an inlet to receive the flow of steam generated from the HRSG, a first outlet to direct the flow of steam generated from the HRSG to the condenser, and a second outlet to direct the flow of steam generated from the HRSG to the steam turbine system. The opening and closing of the three-way HRSG steam flow valve between the outlets is a function of the mode of operation of the gas turbine system, the HRSG, and the steam turbine system. For example, the first outlet of the three-way HRSG steam flow valve can be opened and the second outlet of the three-way HRSG steam flow valve can be closed in the simple cycle mode of operation, while the first outlet of the three-way HRSG steam flow valve can be closed and the second outlet of the three-way HRSG steam flow valve can be opened in the combined-cycle mode of operation.

In one embodiment, the steam flow valving arrangement can include a first isolation HRSG steam flow valve to stop the flow of the steam from the HRSG to the steam turbine system and a second isolation HRSG steam flow valve to stop the flow of the steam from the HRSG to the condenser. Operation of the first isolation HRSG steam flow valve and the second isolation HRSG steam flow valve is a function of the mode of operation of the gas turbine system, the HRSG, and the steam turbine system. For example, the first isolation HRSG steam flow valve can be closed to stop the flow of the steam from the HRSG to the steam turbine system and the second isolation HRSG steam flow valve can be opened to permit the flow of the steam from the HRSG to the condenser in the simple cycle mode of operation, while the first isolation HRSG steam flow valve can be opened to permit the flow of the steam from the HRSG to the steam turbine system and the second isolation valve can be closed to stop the flow of the steam from the HRSG to the condenser in the combined-cycle mode of operation.

In one embodiment, the condenser can comprise one or more condensers. For example, the condenser can comprise a single condenser sized to handle full steam flow that includes steam flow received from the HRSG in the simple cycle mode of operation while the steam turbine system is bypassed, and steam flow from the steam turbine system in the combined-cycle mode of operation. In another example, the condenser can comprise at least one dedicated steam turbine condenser to receive steam flow from the steam turbine system in the combined-cycle mode of operation and one or more additional condensers to handle incremental steam flow from the HRSG during the simple cycle mode of operation (i.e., an incremental HRSG condenser).

In an embodiment in which at least one dedicated steam turbine condenser is used to receive steam flow from the steam turbine system in the combined-cycle mode of operation and one or more incremental HRSG condensers is used to receive steam flow from the HRSG during the simple cycle mode of operation, a second steam flow valving arrangement can be operatively coupled with the steam turbine system and each of the condensers. This second steam flow valving arrangement can include one of a three-way steam turbine exhaust steam flow valve and an array of isolation steam turbine exhaust flow valves.

The use of the steam flow valving arrangement of the various embodiments eliminates the need for a separate diverter damper and bypass stack that is typically relied upon for performing a simple cycle mode of operation. Moreover, the steam flow valving arrangement of the various embodiments obviates any need to address the aforementioned technical problem by configuring the diverter damper and bypass stack with a hot SCR system to place the gas turbine system in emissions compliance for the simple cycle operation. By eliminating the need for a separate diverter damper and bypass stack for the simple cycle operation, emissions reduction can be managed by an SCR system and stack downstream of the HRSG. To this extent, the SCR system and stack downstream of the HRSG can provide emissions reduction in either gas turbine operation mode, i.e., the simple cycle mode of operation or the combined-cycle mode of operation. Having to use only one SCR system that is typically deployed with an HRSG in a CCPP to obtain emissions compliance for both the simple cycle operation and the combined-cycle operation is an advantage over the approach that relies on using a hot SCR system with the diverter damper and bypass stack upstream of the HRSG to obtain emissions compliance in the simple cycle mode and that necessitates another SCR system downstream of the HRSG to provide emissions compliance in the combined-cycle mode.

In accordance with one embodiment, a power plant is provided. The power plant comprises: a gas turbine system; a steam turbine system; a heat recovery steam generator (HRSG) to generate steam from exhaust of the gas turbine system; a condenser to condense steam from one of the steam turbine system and the HRSG; and a first steam flow valving arrangement operatively coupled with the steam turbine system, the HRSG, and the condenser, wherein the first steam flow valving arrangement is configured to direct a flow of steam generated from the HRSG to the condenser and bypassing the steam turbine system during a simple cycle mode of operation; and wherein the first steam flow valving arrangement is configured to direct the flow of steam generated in the HRSG to the steam turbine system during a combined-cycle mode of operation.

In accordance with a second embodiment, a combined-cycle power plant is provided. The combined-cycle power plant comprises: a gas turbine system; a steam turbine system; a heat recovery steam generator (HRSG) to generate steam from exhaust of the gas turbine system; at least one condenser to condense steam from one of the steam turbine system and the HRSG; a HRSG steam flow line to supply the steam from the HRSG to the steam turbine system and the at least one condenser, the HRSG steam flow line comprising a first HRSG steam flow line to supply the steam from the HRSG to the steam turbine system and a second HRSG steam flow line branching off the first HRSG steam flow line to supply the steam from the HRSG to the at least one condenser; and an HRSG steam flow valving arrangement operatively coupled with the HRSG steam flow line, wherein the HRSG steam flow valving arrangement is configured to direct a flow of steam generated in the HRSG to the at least one condenser bypassing the steam turbine system during a simple cycle mode of operation, and wherein the HRSG steam flow valving arrangement is configured to direct the flow of steam generated in the HRSG to the steam turbine system during a combined-cycle mode of operation.

In accordance with a third embodiment, a method of operating a power plant having a gas turbine system, a steam turbine system, a heat recovery steam generator (HRSG) to generate steam from exhaust of the gas turbine system and a condenser to condense steam is disclosed. The method comprises: providing a steam flow valving arrangement having at least one valve that is operatively coupled with the steam turbine system, the HRSG, and the condenser, wherein the steam flow valving arrangement is configured to direct a flow of steam generated in the HRSG to the condenser bypassing the steam turbine system during a simple cycle mode of operation, and wherein the steam flow valving arrangement is configured to direct the flow of steam generated in the HRSG to the steam turbine system during a combined-cycle mode of operation; and specifying a position of the at least one valve in the steam flow valving arrangement to operate in the simple cycle mode of operation or the combined-cycle mode of operation, wherein the steam flow valving arrangement is configured to fully stop the flow of steam generated in the HRSG from entering the steam turbine system and direct all of the flow of steam from the HRSG to the condenser in the simple cycle mode of operation, and wherein the steam flow valving arrangement is configured to fully stop the flow of steam generated in the HRSG from going to the condenser and direct all of the flow of steam from the HRSG to the steam turbine system in the combined-cycle mode of operation.

BRIEF DESCRIPTION OF THE DRAWINGS

The present technology will be better understood from reading the following description of non-limiting embodiments, with reference to the attached drawings, wherein below.

DETAILED DESCRIPTION

Example embodiments of the present disclosure will be described more fully hereinafter with reference to the accompanying drawings, in which some, but not all embodiments are shown. Indeed, the present technology may be embodied in many different forms and should not be construed as limited to the embodiments set forth herein. Rather, these embodiments are provided so that this disclosure will satisfy applicable legal requirements. For ease of understanding, like numbers may refer to like elements throughout.

Throughout the discussion that follows, it may become necessary to use certain descriptive terms when referring to and describing relevant machine components within a gas turbine system, a steam turbine system, and/or a combined CCPP. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein. These terms and their definitions, unless stated otherwise, are as follows. For example, as used herein, "downstream" and "upstream" are terms that indicate a direction relative to the flow of a fluid, such as the steam through fluid flow lines, piping, conduits, and the like, or for example, the flow of air through a combustor or coolant through one of the turbine's component systems. For example, the term "downstream" corresponds to the direction of flow of the fluid, and the term "upstream" refers to the direction opposite to the flow.

As indicated above, the disclosure provides a steam flow valving arrangement that allows a gas turbine system in a CCPP to perform a simple cycle operation with an HRSG by way of bypassing a steam turbine system such that steam generated in the HRSG flows directly to a condenser from which condensate from the steam is pumped back to the HRSG. In addition, the steam flow valving arrangement allows the gas turbine system to perform a combined-cycle operation where the steam generated in the HRSG flows to the steam turbine system to generate power, and condensate from the steam by way of the condenser is pumped back to the HRSG. Both the simple cycle operation and the combined-cycle operation can be performed through the use of a steam flow valving arrangement according to any of the various embodiments and notably can be in emissions compliance for both operations.

Figure 1:
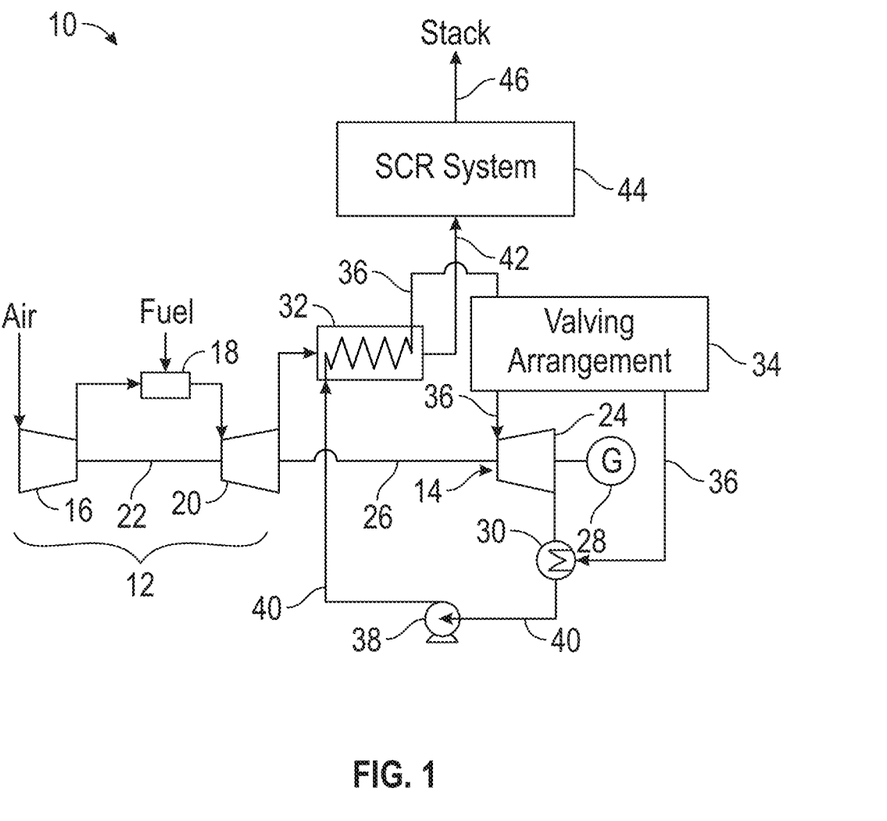
FIG. 1 shows a schematic diagram of a CCPP with a gas turbine system that can operate in a combined-cycle mode of operation with an HRSG and a steam turbine system and that can operate, alternately, in a simple cycle mode of operation with the HRSG where steam flow from the HRSG to the steam turbine system is bypassed and is instead directed to a condenser, with both operation modes being in emissions compliance, according to an embodiment of the present disclosure.

Referring now to the figures, FIG. 1 shows a schematic diagram of a CCPP 10 according to an embodiment of the present disclosure. As shown in FIG. 1, the CCPP 10 can include a gas turbine system 12 and a steam turbine system 14 that is fluidly coupled to the gas turbine system 12.

The gas turbine system 12 may include a compressor 16 and a combustor 18. The gas turbine system 12 can also include a gas turbine 20 (i.e., an expansion turbine) coupled to a common compressor/turbine shaft 22. In one embodiment, the gas turbine system 12 is a 7HA engine, commercially available from GE Vernova, Greenville, S.C. The embodiments of the present disclosure are not limited to any one particular gas turbine system, or gas turbine manufacturer, and may be implemented in connection with other engines including, for example, the 7EA, 7FA, 9FA, or 9HA engine models of GE Vernova. In operation, air entering an inlet of the compressor 16 is compressed and then discharged to the combustor 18 where fuel such as a gas, e.g., natural gas, or a fluid, e.g., oil, is burned to provide high energy combustion gases which drive the gas turbine 20. In the gas turbine 20, the energy of the hot gases is converted into work, some of which is used to the drive compressor 16 through rotating the shaft 22.

The steam turbine system 14 can include one or more steam turbine sections or segments 24. Although not shown in FIG. 1 or any of the other figures of this disclosure, the steam turbine system 14 can include a high pressure (HP) section, an intermediate pressure (IP) section and a low pressure (LP) section. Each of the steam turbine sections 24 of the steam turbine system 14 can include a plurality of rotating blades (not shown) mechanically coupled to a shaft 26, which rotate the shaft based on the steam flow therethrough. For example, a steam cycle circuit can direct a steam flow to enter an inlet of an HP section, an IP section, and/or an LP section. Steam is channeled therein to impart a force on blades thereof causing the shaft 26 to rotate. In this manner, the steam formed in an upstream steam turbine section may be employed later in a downstream steam turbine section. To this extent, the steam drives at least a part of steam turbine system 14 in which work is extracted to drive the shaft 26.

The shaft 26 of the steam turbine system can be coupled to the shaft 22 of the gas turbine system 12 to form a common shaft to drive a load such as a generator 28 for producing electricity. For example, the generator 28 can produce electricity based on the work of the common shaft that is converted from the thermal energy of the hot gases in the gas turbine 20 in a simple cycle operation or on the work of the common shaft that is converted from both the energy of the hot gases in the gas turbine 20 and the pressurized steam of the steam turbine section(s) 24 in a combined-cycle operation.

It is understood that the common shaft configuration depicted in FIG. 1 represents only one possible implementation as those skilled in the art will appreciate that other design options are possible. For example, the generator may optionally be located between the gas turbine system 12 and the steam turbine system 14. In this configuration, the steam turbine system 14 may be decoupled via a clutch.

A condenser 30 may be operably coupled to an appropriate steam turbine section 24 of the steam turbine system 12. For example, the condenser 30 may be in fluid communication with a last-in-line steam turbine section such as, for example, an LP section. In general, the condenser 30 can cool exhaust steam from the steam turbine section 24, collect the latent heat of the steam, and condense the steam into water.

The CCPP 10 may also include a steam generating source such as an HRSG 32 operably connected to the gas turbine system 12 and the steam turbine system 14. As understood, exhaust from the gas turbine system 12 can be used by the HRSG 32 to create steam flow(s) for use by the steam turbine system 14. The HRSG 32 may include a conventional or once-through HRSG configuration, such as those used in conventional combined-cycle power systems, and/or may be embodied as another type of heat exchanger or similar component for using exhaust energy to produce steam. For example, the HRSG 32 may include thermally conductive tubes, pipes, lines, etc., with water therein such that water in the HRSG 32 is heated indirectly by exhaust from the gas turbine system 14 to produce the steam flow(s). The HRSG 32 may be fluidly connected to the gas turbine system 12, the steam turbine system 14, and the condenser 30 via fluid flow lines, piping, conduits, or the like, and various fluid flow control devices that can control, regulate, or redirect the flow of a fluid through the lines. Further details of some of the fluid flow lines and the fluid flow control devices that can control, regulate, or redirect the flow of a fluid between the steam turbine system 14, the condenser 30, and the HRSG 32 are described below in more detail.

As shown in FIG. 1, a steam flow valving arrangement 34 can be operatively coupled with the steam turbine system 14, the HRSG 32, and the condenser 30. In one embodiment, the steam flow valving arrangement 34 is configured to direct a flow of steam generated from the HRSG 32 along an HRSG steam flow line 36 to supply the steam from the HRSG to the steam turbine system 14 and the condenser 30. The HRSG steam flow line 36 can comprise a first HRSG steam flow line to supply the steam from the HRSG 32 to the steam turbine system 14 and a second HRSG steam flow line branching off the first HRSG steam flow line at a junction of the two lines to supply the steam from the HRSG to the condenser 30.

In one embodiment, the steam flow valving arrangement 34 can be configured to direct a flow of steam generated from the HRSG 32 to the condenser 30 and bypassing the steam turbine system 14 during a simple cycle mode of operation. In a combined-cycle mode of operation, the steam flow valving arrangement 34 can be configured to direct the flow of steam generated in the HRSG 32 to the steam turbine system 14 via one of the HRSG steam flow lines 36 dedicated to supplying steam flow from the HRSG to the steam turbine.

It is understood that as the steam flow valving arrangement 34 directs the steam from the HRSG 32 to bypass the steam turbine system 14 and to supply the condenser 30 in a simple cycle mode of operation, the bypassing of the steam flow can include a full bypass of the steam turbine or a partial bypass. In a full bypass of the steam turbine system 14, the steam flow valving arrangement 34 can fully stop the flow of steam generated in the HRSG 32 from entering the steam turbine and can direct all of the flow of steam from the HRSG to the condenser 30. In a partial bypass of the steam turbine system 14, the steam flow valving arrangement 34 can permit a first partial flow of steam generated in the HRSG 32 to enter the steam turbine system 14 and a second partial flow of steam generated in the HRSG 32 to enter the condenser 30. This capability is advantageous as it allows greater flexibility in plant total output that can be achieved for the CCPP 10 because it can accommodate steam turbine part-load operation as in-between points of full combined-cycle and full simple cycle operational modes.

Similarly, instead of having the steam flow valving arrangement 34 direct all of the flow of steam from the HRSG 32 to the steam turbine system 14 without any diversion to the condenser 30, the flow valving arrangement 34 in a combined-cycle mode of operation can permit a partial flow of steam generated in the HRSG 32 to flow towards the condenser 30 so that there is some diversion of the steam to the condenser 30. As noted above, this capability would also be advantageous as it allows greater flexibility in plant total output because it can accommodate steam turbine part-load operation as in-between points of full combined-cycle and full simple cycle operational modes.

To this extent, the steam flow valving arrangement 34 can be utilized as part of a method for operating a CCPP having a gas turbine system, a steam turbine system, an HRSG to generate steam from exhaust of the gas turbine system, and a condenser to condense steam from one of the steam turbine system and the HRSG. For example, a position of at least one valve in the steam flow valving arrangement can be specified to operate in the simple cycle mode of operation or the combined-cycle mode of operation. For example, the position of the at least one valve can be set to fully stop the flow of steam generated in the HRSG from entering the steam turbine system and to direct all of the flow of steam from the HRSG to the condenser in the simple cycle mode of operation. The position of the at least one valve can also be set to fully stop the flow of steam generated in the HRSG from going to the condenser and to direct all of the flow of steam from the HRSG to the steam turbine system in the combined-cycle mode of operation. In one embodiment, the position of the at least one valve can be set to permit partial flows of steam from the HRSG to the condenser and the steam turbine as the method of operating the power plant transitions between a full combined-cycle mode of operation (in which a full flow of steam generated in the HRSG is directed to the steam turbine system without any diversion to the condenser) and a full simple cycle mode of operation (in which the full flow of steam generated from the HRSG is directed to the condenser fully bypassing the steam turbine system).

In one embodiment, the condenser 30 can receive steam from either the steam exhaust of the steam turbine system 14 or the steam generated in the HRSG 32. In this manner, the condenser 30 can cool the steam from the steam turbine system 14 or the HRSG 32, collect the latent heat of the steam, and condense the steam into water. As shown in FIG. 1, a condensate pump 38 can pressurize condensed water released from the condenser 30 into condensate piping 40 for supply back to the HRSG 32 as feedwater.

In one embodiment as shown in FIG. 1, a flow of the flue gases 42 from the HRSG 36 can be directed to an emissions control device, such as an SCR system 44 for reducing NO, (e.g., nitric oxide (NO), nitrogen dioxide ($NO_2$), and other oxides of nitrogen). In general, the SCR system 44 can reduce $NO_x$ emissions by injecting ammonia ($NH_3$) in the flue gases upstream of a catalyst. To this extent, the $NO_x$ in the flue gases 42 can be reduced to water and nitrogen so that the SCR system 44 can release $NO_x$-reduced flue gases 46 into the atmosphere via a stack.

Although the emissions control device of the various embodiments is described as an SCR system it is understood that the embodiments are suitable for use with any now known or later developed emissions control devices.

In any event, the configuration depicted in FIG. 1 enables the various embodiments to eliminate the need for a separate diverter damper and bypass stack that is typically relied upon for performing a simple cycle mode of operation, which would be implemented upstream of the HRSG 32. Moreover, the steam flow valving arrangement 34 of the various embodiments obviates any need to address the aforementioned technical problem by configuring the diverter damper and bypass stack with a hot SCR system to place the gas turbine system in emissions compliance for the simple cycle operation. By eliminating the need for a separate diverter damper and bypass stack for the simple cycle operation, emissions reduction can be managed by the SCR system 44 and stack downstream of the HRSG 32. To this extent, the SCR system 44 and stack downstream of the HRSG 32 can provide emissions reduction in both modes of turbine operation, i.e., the simple cycle mode of operation and the combined-cycle mode of operation.

Having to use only one SCR system that is typically deployed with an HRSG in a CCPP to obtain emissions compliance for both the simple cycle operation and the combined-cycle operation is an advantage over the approach that would rely on using a hot SCR system with the diverter damper and bypass stack upstream of the HRSG to obtain emissions compliance in the simple cycle mode and another SCR system downstream of the HRSG to provide emissions compliance in the combined-cycle mode. The present system results in significant savings in capital expenditures and operating and maintenance costs over the life of the CCPP.

It is understood that for purposes of clarity in describing the various embodiments of the present disclosure, only certain aspects of the CCPP 10 such as the gas turbine system 12, the steam turbine system 14, the HRSG 32, the condenser 30, and the steam flow valving arrangement 34 are depicted and explained in detail. Those skilled in the art will appreciate that the CCPP 10 including the gas turbine system 12, the steam turbine system 14, the HRSG 32, the condenser 30, and the steam flow valving arrangement 34 can include additional components that allow the plant to operate in emissions compliance in both the simple cycle and combined-cycle modes of operation.

For example, it is understood that a desuperheater would be deployed to desuperheat the superheated steam that is generated by the HRSG 32. In general, the superheated steam generated in the HRSG 32 is at a temperature that is higher than the saturation temperature for the steam pressure. This extra heat results in steam that is higher than the saturation temperature, contains more energy than saturated steam, and has a greater specific volume than the saturated steam. In order to control the temperature of the steam to meet certain steam turbine inlet requirements at the steam turbine system 14 and prevent thermal damage to superheater and reheater tubes that can form part of the design of an HRSG, desuperheaters (also referred to as attemperators) are deployed to operate with the superheater and the reheater. In this manner, a desuperheater can restore the superheated steam to its saturated state or reduce the temperature of the superheated steam. For example, when the desuperheater is operational, a measured amount of water is added to the superheated steam via a mixing arrangement within the desuperheater. As it enters the desuperheater, the cooling water evaporates by absorbing heat from the superheated steam. Consequently, the temperature of the steam will be reduced.

A deaerator that can facilitate the reduction of the gas content in the feedwater that is supplied to the HRSG 32 from the condenser 30 is another component commonly utilized in the CCPP 10. In general, a deaerator can include an inventory or storage tank of water obtained from a condensate system via a condensate pump and condensate piping, an auxiliary steam source or other heating source to heat the inventory tank, and feedwater supply piping or line that supplies heated feedwater that has been deaerated to the HRSG 32. In operation, the deaerator uses steam from the auxiliary steam source to heat the water to the full saturation temperature corresponding to the steam pressure in the deaerator and to scrub out and carry away dissolved gases from the feedwater that is to be directed to the HRSG 32. In this manner, the deaerator can reduce the concentration of dissolved oxygen and carbon dioxide to a level where the effects of corrosive gases are minimized.

The desuperheater and the deaerator are representative of only a few of the components that are not depicted in FIG. 1 as well as the other figures of the disclosure. Those skilled in the art will appreciate that the CCPP 10, the gas turbine system 12, the steam turbine system 14, and the HRSG 32 can include a number of other well-known components that make up the gas turbine system, the steam turbine system, and HRSG 32 and that enable these elements to operate as part of the CCPP 10.

Further, it is understood that although the CCPP 10 is illustrated in FIG. 1, as well as the other figures, as a single shaft CCPP with a single generator coupled to both the gas turbine system and the steam turbine system via a common shaft, other configurations are suitable for use with the embodiments described herein. For example, each of the gas turbine system and the steam turbine system can be mechanically coupled by a shaft to its own corresponding generator to generate electrical energy, in order to attain a CCPP with a multi-shaft configuration. It is understood that the number of generators and shafts for the CCPP may be of any size or type known in the art and may differ depending upon their application or the system to which they are connected.

Figure 2:
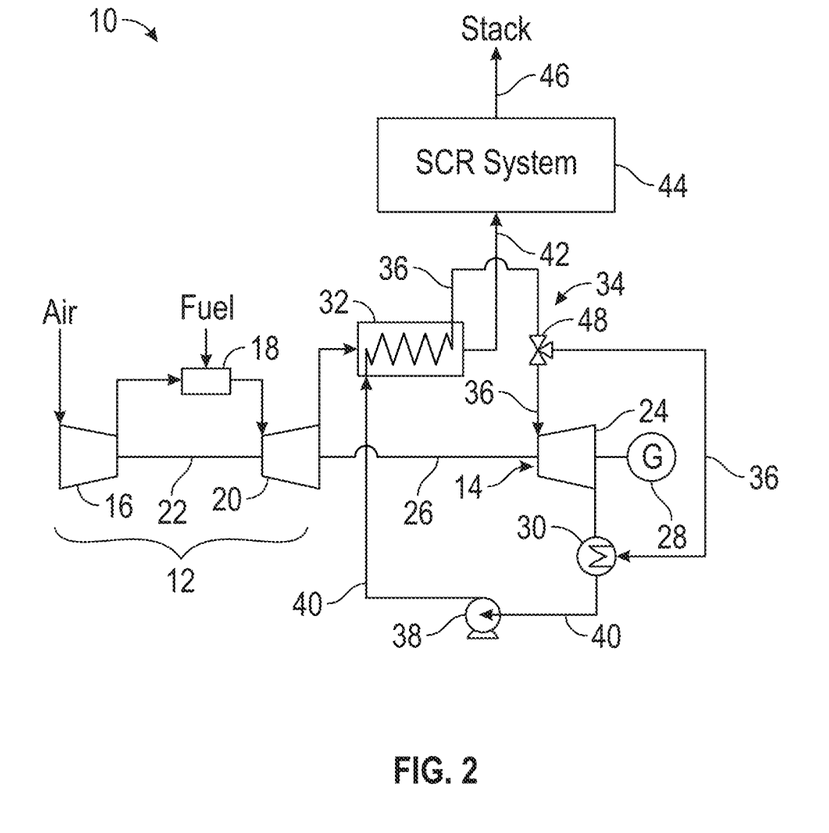
FIG. 2 shows a schematic diagram of the CCPP with the steam flow valving arrangement depicted in FIG. 1 as a three-way valve, according to an embodiment of the present disclosure.

FIG. 2 shows a schematic diagram of the CCPP 10 depicted with the steam flow valving arrangement 34 depicted as a three-way valve 48 according to an embodiment of the present disclosure. In FIG. 2, the three-way valve 48 forms an HRSG steam flow valving arrangement that is operatively coupled with the HRSG steam flow line 36. To this extent, in the manner described above, the HRSG steam flow valving arrangement formed from the three-way valve 48 is configured to direct a flow of steam generated in the HRSG 32 to the condenser 30 bypassing the steam turbine system 14 during a simple cycle mode of operation. Additionally, the HRSG steam flow valving arrangement formed from the three-way valve 48 is configured to direct the flow of steam generated in the HRSG 32 to the steam turbine system 14 during a combined-cycle mode of operation.

In one embodiment, the three-way valve 48 can include an inlet to receive the flow of steam generated from the HRSG 32, a flow passage, a first outlet to direct the flow of steam generated from the HRSG 32 through the flow passage and the first outlet to the condenser 30, and a second outlet to direct the flow of steam generated from the HRSG 32 through the flow passage and the second outlet to the steam turbine system 14. The opening and closing of the three-way HRSG steam flow valve 48 is a function of the mode of operation of the gas turbine system 12, the HRSG 32, and the steam turbine system 14. For example, the first outlet of the three-way HRSG steam flow valve 48 can be opened, and the second outlet of the three-way HRSG steam flow valve can be closed in the simple cycle mode of operation. In the combined-cycle mode of operation, the first outlet of the three-way HRSG steam flow valve 48 can be closed, and the second outlet of the three-way HRSG steam flow valve 48 can be opened. The opening of the second outlet of the three-way HRSG steam flow valve 48 and the closing of the first outlet of the HRSG steam valve 48 bypasses the steam flow around the steam turbine system 14, via one of the HRSG steam flow lines 36.

Figure 3:
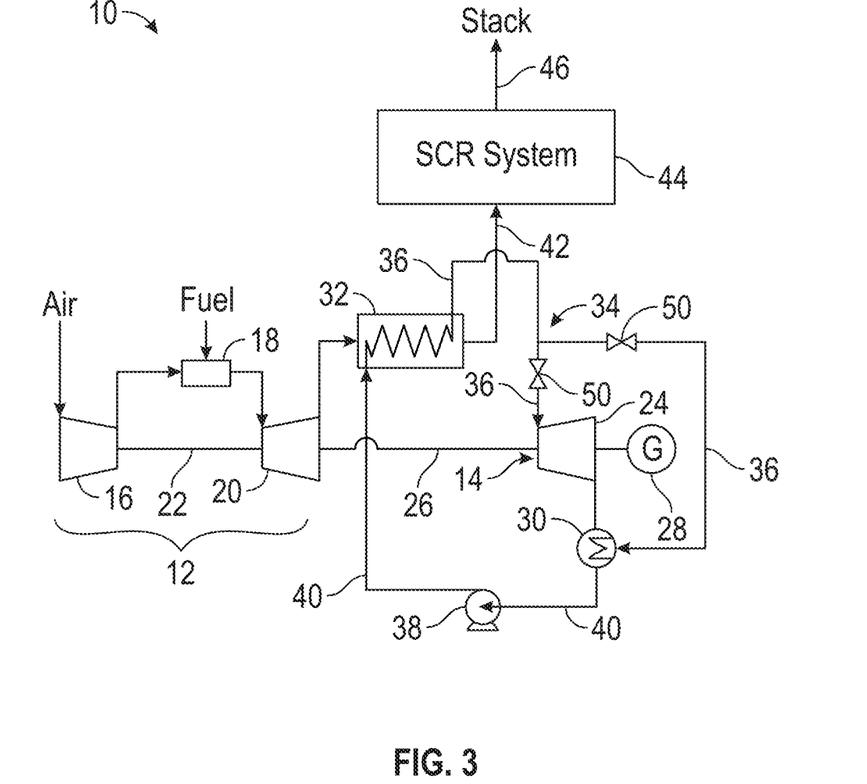
FIG. 3 shows a schematic diagram of the CCPP with the steam flow valving arrangement depicted in FIG. 1 as an array of isolation valves, according to an embodiment of the present disclosure.

FIG. 3 shows a schematic diagram of the CCPP 10 depicted with the steam flow valving arrangement 34 depicted as an array of isolation valves 50 according to an embodiment of the present disclosure. In FIG. 3, the array of isolation valves 50, which can include shut-off valves, on-off valves, stop valves and the like, can form an HRSG steam flow valving arrangement 34 that is operatively coupled with the HRSG steam flow lines 36. In one embodiment, the array of isolation valves can comprise a first isolation HRSG steam flow valve 50 (e.g., the valve upstream of the inlet of the steam turbine section 24) operatively coupled to a first HRSG steam flow line 36 (e.g., the part of the flow line that is in fluid communication with the inlet of the steam turbine system 14) to stop the flow of the steam from the HRSG 30 to the steam turbine system 14 and a second isolation HRSG steam flow valve 50 operatively coupled to the second HRSG steam flow line 36 to stop the flow of the steam from the HRSG 32 to the condenser 30 (e.g., the valve on part of the flow line 36 that branches off of the main line and that is in fluid communication with the condenser 30).

The operation of the first isolation HRSG steam flow valve 50 and the second isolation HRSG steam flow valve 50 is a function of the mode of operation of the gas turbine system 12, the HRSG 32, and the steam turbine system 14. In one embodiment, the first isolation HRSG steam flow valve 50 can be closed to stop the flow of the steam from the HRSG 32 to the steam turbine system 14, and the second isolation HRSG steam flow valve 50 can be opened to permit the flow of the steam from the HRSG 32 to the condenser 30 in the simple cycle mode of operation. In the simple cycle mode of operation, the respective positions of the first and second isolation HRSG steam flow valves 50 result in the steam flow being bypassed around the steam turbine system 14. In the combined-cycle mode of operation, the first isolation HRSG steam flow valve 50 can be opened to permit the flow of the steam from the HRSG 32 to the steam turbine system 14, and the second isolation valve 50 can be closed to stop the flow of the steam from the HRSG 32 to the condenser 30.

Figure 4:
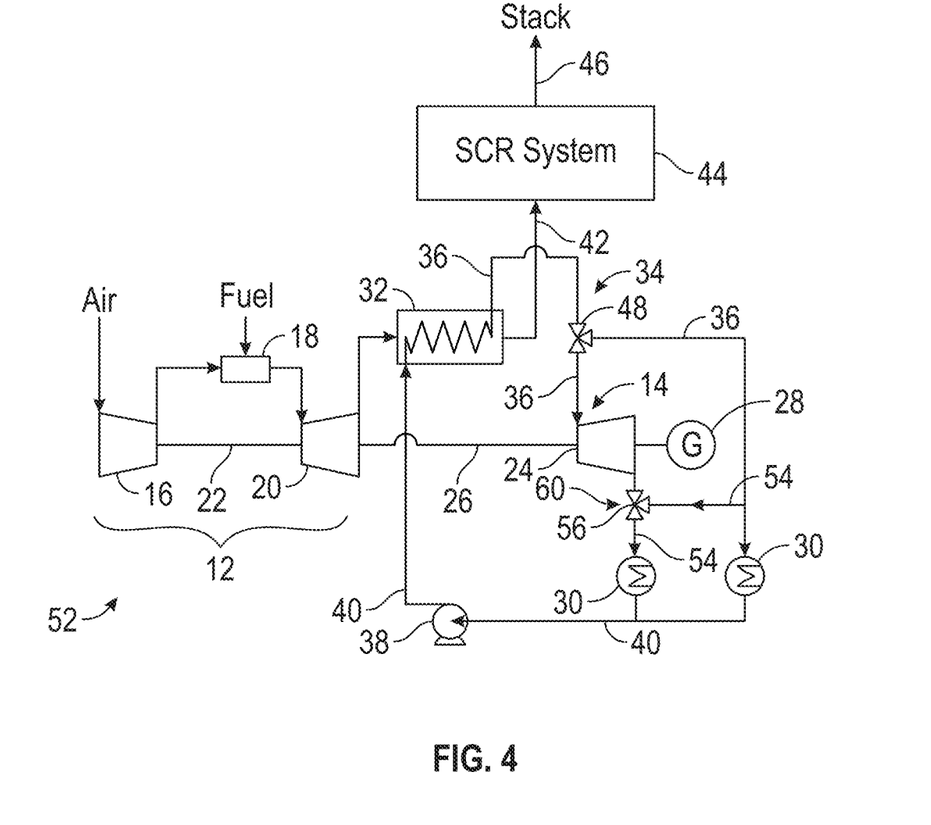
FIG. 4 shows a schematic diagram of an CCPP with more than one condenser, the steam flow valving arrangement configured as a three-way valve and a steam turbine flow valving arrangement configured as a three-way valve to supply the exhaust steam from the steam turbine system to the condenser(s), according to an embodiment of the present disclosure.

FIG. 4 shows a schematic diagram of a CCPP 52 that is similar to the CCPP 10 depicted in FIG. 2, but the CCPP 52 is configured with more than one condenser 30. Instead of a single condenser sized to handle the full steam flow that includes steam flow received from the HRSG 32 in the simple cycle mode of operation while the steam turbine system is bypassed and the steam flow from the steam turbine system 14 in the combined-cycle mode of operation as depicted in FIGS. 1-3, the embodiments depicted in FIGS. 4 and 5 show at least one dedicated condenser to handle the steam flow for the combined-cycle mode and at least one additional condenser to handle the incremental steam flow for the simple-cycle mode (i.e., an incremental HRSG condenser).

Figure 5:
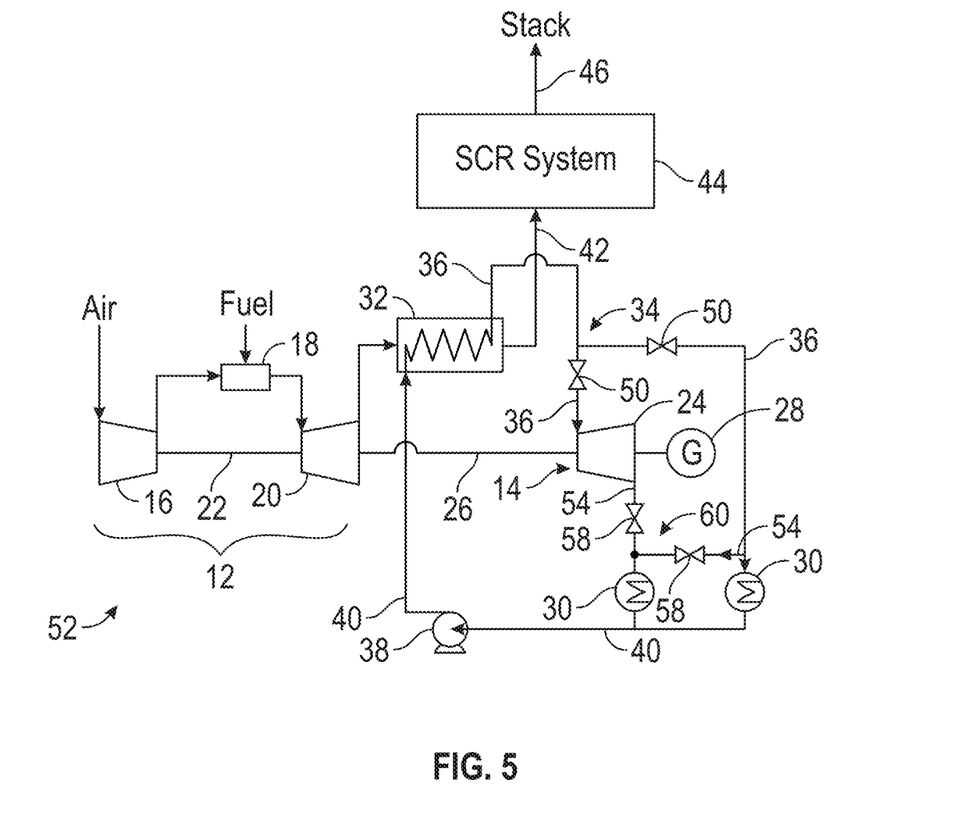
FIG. 5 shows a schematic diagram of a CCPP like the one depicted in FIG. 4, but with an array of isolation valves configured for use as the steam flow valving arrangement and the steam turbine flow valving arrangement, according to an embodiment of the present disclosure.

With the multiple condensers 30 depicted in the embodiments of FIGS. 4 and 5, these figures make note of a steam turbine exhaust line 54 that can supply exhaust steam from the steam turbine system 14 to the condensers 30, as well as receive steam that is diverted from the HRSG steam flow line 36. As shown in the figures, the steam turbine exhaust line 54 can comprise a first exhaust steam flow line to supply the exhaust steam from the steam turbine system 14 to at least one dedicated steam turbine condenser 30 (e.g., the part of the main exhaust line that is in fluid communication with the condenser 30 on the left in the figures). In addition, the steam turbine exhaust line 54 can include a second exhaust steam flow line branching off the HRSG steam flow line 36 to receive a flow of HRSG steam from the HRSG 32 that is directed towards one or more incremental HRSG condensers 30 (e.g., the condenser on the right in the figures). To this extent, the HRSG steam can be diverted from the HRSG steam flow line 36 to the second exhaust steam flow line during a simple cycle mode of operation for supply to the at least one dedicated steam turbine condenser via a steam turbine flow valving arrangement 60. In this manner, the HRSG steam flow can be directed to the to the at least one dedicated steam turbine condenser in addition to the HRSG steam flow provided to the incremental HRSG condensers via the HRSG steam flow line 36.

As shown in FIGS. 4 and 5, the steam turbine flow valving arrangement 60 can be operatively coupled with the steam turbine exhaust line 54 to supply the exhaust steam from the steam turbine system 14 to the condensers 30. The steam turbine flow valving arrangement 60 can comprise a three-way steam turbine exhaust steam flow valve 56 (FIG. 4) or an array of isolation steam turbine exhaust flow valves 58 (FIG. 5). To this extent, both the three-way steam turbine exhaust steam flow valve 56 and the array of isolation steam turbine exhaust flow valves 58 can be operatively coupled with the first exhaust steam flow line and the second exhaust steam flow line of the steam turbine exhaust line 54.

FIG. 4 shows the second steam flow valving arrangement 60 as a three-way steam turbine exhaust flow valve 56. In one embodiment, the three-way steam turbine exhaust flow valve 56 of this second steam flow valving arrangement 60 can include a first inlet to receive the exhaust steam from the steam turbine system 14, a second inlet to receive a diverted flow of HRSG steam from the HRSG steam flow line 36 that is directed from the HRSG 32 to the HRSG incremental condenser 30 (i.e., the condenser on the right of the figure), and an outlet to direct the flow of exhaust steam from the steam turbine system 14 or the diverted flow of the HRSG steam during the simple cycle mode of operation to the at least one dedicated steam turbine condenser 30 (i.e., the condenser on the left in the figure).

FIG. 5 shows the second steam flow valving arrangement 60 as an array of isolation valves 58. In one embodiment, the array of isolation valves 58 of the second steam flow valving arrangement in this embodiment can include a first isolation steam turbine exhaust flow valve 58 to stop the flow of the exhaust steam from the steam turbine system 14 to the at least one dedicated steam turbine condenser 30 (e.g., the valve on the main part of the line that is in fluid communication with the condenser on left-hand side of the figure) and a second isolation steam turbine exhaust flow valve 58 to stop the flow of the exhaust steam from the steam turbine system 14 to the one or more incremental HRSG condensers (e.g., the valve on the part of the line 54 that branches off from the main line and is in fluid communication with the condenser on the right side of the figure). In one embodiment, during a simple cycle mode operation, the second isolation steam turbine exhaust flow valve 58 can be configured to allow a diverted flow of HRSG steam from the HRSG steam flow line 36 that is directed to the HRSG incremental condenser 30 to additionally be supplied to the at least one dedicated steam turbine condenser 30.

With the various embodiments described herein, it should be apparent that the steam flow valving arrangements 34, 60 enable the gas turbine system 12 in the CCPPs 10, 52 of the embodiments to operate in both the simple cycle mode of operation and the combined-cycle mode of operation. Further, the embodiments provide a solution to the technical problem of having a CCPP perform both the simple cycle and the combined-cycle modes of operation in emissions compliance due to the configurations of the gas turbine system, the steam turbine system, the HRSG, the condenser(s), and the steam flow valving arrangements.

In addition, the embodiments offer several advantages over current approaches and any modifications to these approaches that can facilitate both modes of operation in emissions compliance. For example, the use of the steam flow valving arrangements of the various embodiments eliminates the need for a separate diverter damper and bypass stack that is typically relied upon for performing a simple cycle mode of operation in a CCPP. Moreover, the steam flow valving arrangements of the various embodiments obviate any need to address the aforementioned technical problem by configuring the diverter damper and bypass stack with a hot SCR system to place the gas turbine system in emissions compliance for the simple cycle operation. By eliminating the need for a separate diverter damper and bypass stack for the simple cycle operation, emissions reduction for both operations can be managed by a common (i.e., single) SCR system and stack downstream of the HRSG. To this extent, the SCR system and stack downstream of the HRSG can provide emissions reduction in either turbine operation mode, i.e., in both the simple cycle mode of operation and the combined-cycle mode of operation. Having to use only one SCR system that is typically deployed with an HRSG in a CCPP to obtain emissions compliance for both the simple cycle operation and the combined-cycle operation is an advantage over the approach that relies on using a hot SCR system with the diverter damper and bypass stack upstream of the HRSG to obtain emissions compliance in the simple cycle mode, and that necessitates another SCR system in place downstream of the HRSG to provide emissions compliance in the combined-cycle mode.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps, and aspects from different embodiments may be combined or suitable for use in other embodiments, even though not described in the disclosure or depicted in the figures. Therefore, since certain changes may be made in the above-described systems without departing from the spirit and scope of the improvements herein involved, it is intended that all of the subject matter of the above description shown in the accompanying drawings shall be interpreted merely as examples illustrating the inventive concept herein and shall not be construed as limiting the disclosure.

In this regard, while the disclosed subject matter has been described in connection with various embodiments and corresponding figures; where applicable, it is to be understood that other similar embodiments can be used, or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present disclosure are not intended to be interpreted as excluding the existence of additional embodiments that also incorporate the recited features. Within the scope of the disclosure are also embodiments produced by combination in any order and number of embodiments, examples, and features thereof disclosed in the description and in the claims.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A power plant, comprising: a gas turbine system; a steam turbine system; a heat recovery steam generator (HRSG) to generate steam from exhaust of the gas turbine system; a condenser to condense steam from one of the steam turbine system and the HRSG; and a first steam flow valving arrangement operatively coupled with the steam turbine system, the HRSG and the condenser, wherein the first steam flow valving arrangement is configured to direct a flow of steam generated from the HRSG to the condenser bypassing the steam turbine system during a simple cycle mode of operation, and wherein the first steam flow valving arrangement is configured to direct the flow of steam generated in the HRSG to the steam turbine system during a combined-cycle mode of operation.

The power plant of the preceding clause, wherein the first steam flow valving arrangement comprises a three-way HRSG steam flow valve having an inlet to receive the flow of steam generated from the HRSG, a first outlet to direct the flow of steam generated from the HRSG to the condenser, and a second outlet to direct the flow of steam generated from the HRSG to the steam turbine system.

The power plant of any of the preceding clauses, wherein opening and closing the three-way HRSG steam flow valve is a function of the mode of operation of the gas turbine system, the HRSG and the steam turbine system; wherein the first outlet of the three-way HRSG steam flow valve is opened, and the second outlet of the three-way HRSG steam flow valve is closed in the simple cycle mode of operation; and wherein the first outlet of the three-way HRSG steam flow valve is closed, and the second outlet of the three-way HRSG steam flow valve is opened in the combined-cycle mode of operation.

The power plant of any of the preceding clauses, wherein the first steam flow valving arrangement comprises a first isolation HRSG steam flow valve to stop the flow of the steam from the HRSG to the steam turbine system and a second isolation HRSG steam flow valve to stop the flow of the steam from the HRSG to the condenser.

The power plant of any of the preceding clauses, wherein operation of the first isolation HRSG steam flow valve and the second isolation HRSG steam flow valve is a function of the mode of operation of the gas turbine system, the HRSG, and the steam turbine system; wherein the first isolation HRSG steam flow valve is closed to stop the flow of the steam from the HRSG to the steam turbine system, and the second isolation HRSG steam flow valve is opened to permit the flow of the steam from the HRSG to the condenser in the simple cycle mode of operation; and wherein the first isolation HRSG steam flow valve is opened to permit the flow of the steam from the HRSG to the steam turbine system, and the second isolation valve is closed to stop the flow of the steam from the HRSG to the condenser in the combined-cycle mode of operation.

The power plant of any of the preceding clauses, further comprising a first HRSG steam flow line to supply the steam from the HRSG to the steam turbine system and a second HRSG steam flow line branching off the first HRSG steam flow line to supply the steam from the HRSG to the condenser, wherein the first isolation HRSG steam flow valve is operatively coupled to the first HRSG steam flow line and the second isolation HRSG steam flow valve is operatively coupled to the second HRSG steam flow line.

The power plant of any of the preceding clauses, wherein the condenser comprises a single condenser sized to handle full steam flow that includes steam flow received from the HRSG in the simple cycle mode of operation while the steam turbine system is bypassed and steam flow from the steam turbine system in the combined-cycle mode of operation.

The power plant of any of the preceding clauses, wherein the condenser comprises at least one dedicated steam turbine condenser to receive steam flow from the steam turbine system in the combined-cycle mode of operation and one or more incremental HRSG condensers to receive additional steam flow from the HRSG during the simple cycle mode of operation.

The power plant of any of the preceding clauses, further comprising a second steam flow valving arrangement operatively coupled with the steam turbine system and each of the condensers; wherein the second steam flow valving arrangement comprises a three-way steam turbine exhaust flow valve having a first inlet to receive exhaust steam from the steam turbine system, a second inlet to receive a diverted flow of HRSG steam from the HRSG that is directed to the one or more HRSG incremental condensers, and an outlet to direct the flow of exhaust steam from the steam turbine system to the at least one dedicated steam turbine condenser or the diverted flow of HRSG steam to the at least one dedicated steam turbine condenser.

The power plant of any of the preceding clauses, further comprising a second steam flow valving arrangement operatively coupled with the steam turbine system and each of the condensers; wherein the second steam flow valving arrangement comprises a first isolation steam turbine exhaust flow valve to stop the flow of the exhaust steam from the steam turbine system to the at least one dedicated steam turbine condenser and a second isolation steam turbine exhaust flow valve to stop the flow of the exhaust steam from the steam turbine system to the one or more incremental HRSG condensers, wherein the second isolation steam turbine exhaust flow valve is further configured to allow a diverted flow of HRSG steam from the HRSG to the one or more incremental HRSG condensers to be directed to the at least one dedicated steam turbine condenser.

The power plant of any of the preceding clauses, further comprising a first exhaust steam flow line to supply the exhaust steam from the steam turbine system to the at least one dedicated steam turbine condenser and a second exhaust steam flow line in fluid communication with the first exhaust stream flow line that that branches off an HRSG steam flow line that supplies the flow of HRSG steam from the HRSG towards the one or more incremental HRSG condensers to receive the diverted flow of the HRSG steam for supply to the at least one dedicated steam turbine condenser, wherein the first isolation steam turbine exhaust flow valve is operatively coupled to the first exhaust steam flow line and the second isolation steam turbine exhaust flow valve is operatively coupled to the second exhaust steam flow line and the HRSG steam flow line.

The power plant of any of the preceding clauses, further comprising a single selective catalytic reduction (SCR) system downstream of the HRSG.

A combined-cycle power plant, comprising: a gas turbine system; a steam turbine system; a heat recovery steam generator (HRSG) to generate steam from exhaust of the gas turbine system; at least one condenser to condense steam from one of the steam turbine system and the HRSG; a HRSG steam flow line to supply the steam from the HRSG to the steam turbine system and the at least one condenser, the HRSG steam flow line comprising a first HRSG steam flow line to supply the steam from the HRSG to the steam turbine system and a second HRSG steam flow line branching off the first HRSG steam flow line to supply the steam from the HRSG to the at least one condenser; and an HRSG steam flow valving arrangement operatively coupled with the HRSG steam flow line, wherein the HRSG steam flow valving arrangement is configured to direct a flow of steam generated in the HRSG to the at least one condenser bypassing the steam turbine system during a simple cycle mode of operation, and wherein the HRSG steam flow valving arrangement is configured to direct the flow of steam generated in the HRSG to the steam turbine system during a combined-cycle mode of operation.

The combined-cycle power plant of the preceding clause, wherein the HRSG steam flow valving arrangement comprises a three-way HRSG steam flow valve or an array of isolation valves operatively coupled with the HRSG steam flow line.

The combined-cycle power plant of any of the preceding clauses, wherein the three-way HRSG steam flow valve of the HRSG steam flow valving arrangement includes an inlet to receive the flow of steam generated from the HRSG, a first outlet to direct the flow of steam generated from the HRSG to the at least one condenser, and a second outlet to direct the flow of steam generated from the HRSG to the steam turbine system; wherein the opening and closing of the three-way HRSG steam flow valve is a function of the mode of operation of the gas turbine system, the HRSG, and the steam turbine system; wherein the first outlet of the three-way HRSG steam flow valve is opened, and the second outlet of the three-way HRSG steam flow valve is closed in the simple cycle mode of operation; and wherein the first outlet of the three-way HRSG steam flow valve is closed, and the second outlet of the three-way HRSG steam flow valve is opened in the combined-cycle mode of operation.

The combined-cycle power plant of any of the preceding clauses, wherein the array of isolation valves of the HRSG steam flow valving arrangement comprises a first isolation HRSG steam flow valve operatively coupled to the first HRSG steam flow line to stop the flow of the steam from the HRSG to the steam turbine system and a second isolation HRSG steam flow valve operatively coupled to the second HRSG steam flow line to stop the flow of the steam from the HRSG to the at least one condenser.

The combined-cycle power plant of any of the preceding clauses, wherein the at least one condenser comprises at least one dedicated steam turbine condenser and one or more incremental HRSG condensers; and further comprising: a steam turbine exhaust line to supply exhaust steam from the steam turbine system to the at least one condenser, the steam turbine exhaust line comprising a first exhaust steam flow line to supply the exhaust steam from the steam turbine system to the at least one dedicated steam turbine condenser and a second exhaust steam flow line in fluid communication with the first exhaust steam flow line that branches off the HRSG steam flow line to receive a diverted flow of HRSG steam for supply to the at least one dedicated steam turbine condenser; and a steam turbine flow valving arrangement operatively coupled with the steam turbine exhaust line to supply the exhaust steam from the steam turbine system to the at least one condenser, wherein the steam turbine flow valving arrangement comprises a three-way steam turbine exhaust steam flow valve or an array of isolation steam turbine exhaust flow valves, both the three-way steam turbine exhaust steam flow valve and the array of isolation steam turbine exhaust flow valves operatively coupled with the first exhaust steam flow line and the second exhaust steam flow line.

The combined-cycle power plant of any of the preceding clauses, wherein the second exhaust steam flow is fluidly coupled to a second HRSG steam flow line; and wherein the one or more incremental HRSG condensers are configured to receive HRSG steam from the second HRSG steam flow line during a simple cycle mode of operation and are configured to receive exhaust steam from the steam turbine system during a combined-cycle mode of operation.

A method of operating a power plant having a gas turbine system, a steam turbine system, a heat recovery steam generator (HRSG) to generate steam from exhaust of the gas turbine system and a condenser to condense steam selectively supplied from one of the steam turbine system and the HRSG, the method comprising: providing a steam flow valving arrangement having at least one valve that is operatively coupled with the steam turbine system, the HRSG and the condenser, wherein the steam flow valving arrangement is configured to direct a flow of steam generated in the HRSG to the condenser bypassing the steam turbine system during a simple cycle mode of operation, and wherein the steam flow valving arrangement is configured to direct the flow of steam generated in the HRSG to the steam turbine system during a combined-cycle mode of operation; and specifying a position of the at least one valve in the steam flow valving arrangement to operate in the simple cycle mode of operation or the combined-cycle mode of operation, wherein the steam flow valving arrangement is configured to fully stop the flow of steam generated in the HRSG from entering the steam turbine system and to direct all of the flow of steam from the HRSG to the condenser in the simple cycle mode of operation, and wherein the steam flow valving arrangement is configured to fully stop the flow of steam generated in the HRSG from going to the condenser and to direct all of the flow of steam from the HRSG to the steam turbine system in the combined-cycle mode of operation.

The method of the preceding clause, further comprising specifying the position of the at least one valve in the steam flow valving arrangement to permit a first partial flow of steam from the HRSG to the condenser and a second partial flow of steam from the HRSG to the steam turbine system as the power plant transitions between a full combined-cycle mode of operation in which a full flow of steam generated in the HRSG is directed to the steam turbine system without any diversion to the condenser and a full simple cycle mode of operation in which the full flow of steam generated from the HRSG is directed to the condenser bypassing the steam turbine system.

What is claimed is:

1. A power plant, comprising:
a gas turbine system;
a steam turbine system;
a heat recovery steam generator (HRSG) to generate steam from exhaust of the gas turbine system;
a condenser to condense steam from one of the steam turbine system and the HRSG; and
a first steam flow valving arrangement operatively coupled with the steam turbine system, the HRSG, and the condenser, wherein the first steam flow valving arrangement is configured to direct a flow of steam generated from the HRSG to the condenser bypassing the steam turbine system during a simple cycle mode of operation, and wherein the first steam flow valving arrangement is configured to direct the flow of steam generated in the HRSG to the steam turbine system during a combined-cycle mode of operation, and wherein the first steam flow valving arrangement comprises a three-way HRSG steam flow valve having an inlet to receive the flow of steam generated from the HRSG, a first outlet to direct the flow of steam generated from the HRSG to the condenser, and a second outlet to direct the flow of steam generated from the HRSG to the steam turbine system.

2. The power plant of claim 1, wherein opening and closing the three-way HRSG steam flow valve is a function of the mode of operation of the gas turbine system, the HRSG, and the steam turbine system; wherein the first outlet of the three-way HRSG steam flow valve is opened, and the second outlet of the three-way HRSG steam flow valve is closed in the simple cycle mode of operation; and wherein the first outlet of the three-way HRSG steam flow valve is closed, and the second outlet of the three-way HRSG steam flow valve is opened in the combined-cycle mode of operation.

3. The power plant of claim 1, wherein the condenser comprises a single condenser sized to handle full steam flow that includes steam flow received from the HRSG in the simple cycle mode of operation while the steam turbine system is bypassed and steam flow from the steam turbine system in the combined-cycle mode of operation.

4. The power plant of claim 1, wherein the condenser comprises at least one dedicated steam turbine condenser to receive steam flow from the steam turbine system in the combined-cycle mode of operation and one or more incremental HRSG condensers to receive additional steam flow from the HRSG during the simple cycle mode of operation.

5. The power plant of claim 4, further comprising a second steam flow valving arrangement operatively coupled with the steam turbine system and each of the condensers; wherein the second steam flow valving arrangement comprises a three-way steam turbine exhaust flow valve having a first inlet to receive exhaust steam from the steam turbine system, a second inlet to receive a diverted flow of HRSG steam from the HRSG that is directed to the one or more HRSG incremental condensers, and an outlet to direct the flow of exhaust steam from the steam turbine system to the at least one dedicated steam turbine condenser or the diverted flow of HRSG steam to the at least one dedicated steam turbine condenser.

6. The power plant of claim 4, further comprising a second steam flow valving arrangement operatively coupled with the steam turbine system and each of the condensers; wherein the second steam flow valving arrangement comprises a first isolation steam turbine exhaust flow valve to stop the flow of the exhaust steam from the steam turbine system to the at least one dedicated steam turbine condenser and a second isolation steam turbine exhaust flow valve to stop the flow of the exhaust steam from the steam turbine system to the one or more incremental HRSG condensers, wherein the second isolation steam turbine exhaust flow valve is further configured to allow a diverted flow of HRSG steam from the HRSG to the one or more incremental HRSG condensers to be directed to the at least one dedicated steam turbine condenser.

7. The power plant of claim 6, further comprising a first exhaust steam flow line to supply the exhaust steam from the steam turbine system to the at least one dedicated steam turbine condenser and a second exhaust steam flow line in fluid communication with the first exhaust steam flow line that branches off an HRSG steam flow line that supplies the flow of HRSG steam from the HRSG towards the one or more incremental HRSG condensers to receive the diverted flow of the HRSG steam for supply to the at least one dedicated steam turbine condenser, wherein the first isolation steam turbine exhaust flow valve is operatively coupled to the first exhaust steam flow line and the second isolation steam turbine exhaust flow valve is operatively coupled to the second exhaust steam flow line and the HRSG steam flow line.

8. The power plant of claim 1, further comprising a single selective catalytic reduction (SCR) system downstream of the HRSG.

9. A combined-cycle power plant, comprising:
a gas turbine system;
a steam turbine system;
a heat recovery steam generator (HRSG) to generate steam from exhaust of the gas turbine system;
at least one condenser to condense steam from one of the steam turbine system and the HRSG;
a HRSG steam flow line to supply the steam from the HRSG to the steam turbine system and the at least one condenser, the HRSG steam flow line comprising a first HRSG steam flow line to supply the steam from the HRSG to the steam turbine system and a second HRSG steam flow line branching off the first HRSG steam flow line to supply the steam from the HRSG to the at least one condenser; and
an HRSG steam flow valving arrangement operatively coupled with the HRSG steam flow line, wherein the HRSG steam flow valving arrangement is configured to direct a flow of steam generated in the HRSG to the at least one condenser bypassing the steam turbine system during a simple cycle mode of operation, and wherein the HRSG steam flow valving arrangement is configured to direct the flow of steam generated in the HRSG to the steam turbine system during a combined-cycle mode of operation, and wherein the HRSG steam flow valving arrangement comprises a three-way HRSG steam flow valve.

10. The combined-cycle power plant of claim 9, wherein the three-way HRSG steam flow valve of the HRSG steam flow valving arrangement includes an inlet to receive the flow of steam generated from the HRSG, a first outlet to direct the flow of steam generated from the HRSG to the at least one condenser, and a second outlet to direct the flow of steam generated from the HRSG to the steam turbine system; wherein the opening and closing of the three-way HRSG steam flow valve is a function of the mode of operation of the gas turbine system, the HRSG, and the steam turbine system; wherein the first outlet of the three-way HRSG steam flow valve is opened, and the second outlet of the three-way HRSG steam flow valve is closed in the simple cycle mode of operation; and wherein the first outlet of the three-way HRSG steam flow valve is closed, and the second outlet of the three-way HRSG steam flow valve is opened in the combined-cycle mode of operation.

11. The combined-cycle power plant of claim 9, wherein the at least one condenser comprises at least one dedicated steam turbine condenser and one or more incremental HRSG condensers; and further comprising:
   a steam turbine exhaust line to supply exhaust steam from the steam turbine system to the at least one condenser, the steam turbine exhaust line comprising a first exhaust steam flow line to supply the exhaust steam from the steam turbine system to the at least one dedicated steam turbine condenser and a second exhaust steam flow line in fluid communication with the first exhaust steam flow line that branches off the HRSG steam flow line to receive a diverted flow of HRSG steam for supply to the at least one dedicated steam turbine condenser; and
   a steam turbine flow valving arrangement operatively coupled with the steam turbine exhaust line to supply the exhaust steam from the steam turbine system to the at least one condenser, wherein the steam turbine flow valving arrangement comprises a three-way steam turbine exhaust steam flow valve or an array of isolation steam turbine exhaust flow valves, both the three-way steam turbine exhaust steam flow valve and the array of isolation steam turbine exhaust flow valves operatively coupled with the first exhaust steam flow line and the second exhaust steam flow line.

12. The combined-cycle power plant of claim 11, wherein the second exhaust steam flow line is fluidly coupled to the second HRSG steam flow line; and wherein the one or more incremental HRSG condensers are configured to receive HRSG steam from the second HRSG steam flow line during a simple cycle mode of operation and are configured to receive exhaust steam from the steam turbine system during a combined-cycle mode of operation.

13. A method of operating a power plant having a gas turbine system, a steam turbine system, a heat recovery steam generator (HRSG) to generate steam from exhaust of the gas turbine system, and a condenser to condense steam selectively supplied from one of the steam turbine system and the HRSG, the method comprising:

providing a steam flow valving arrangement having at least one valve that is operatively coupled with the steam turbine system, the HRSG, and the condenser, wherein the steam flow valving arrangement is configured to direct a flow of steam generated in the HRSG to the condenser bypassing the steam turbine system during a simple cycle mode of operation, and wherein the steam flow valving arrangement is configured to direct the flow of steam generated in the HRSG to the steam turbine system during a combined-cycle mode of operation, and wherein the steam flow valving arrangement comprises a three-way HRSG steam flow valve having an inlet to receive the flow of steam generated from the HRSG, a first outlet to direct the flow of steam generated from the HRSG to the condenser, and a second outlet to direct the flow of steam generated from the HRSG to the steam turbine system; and
   specifying a position of the at least one valve in the steam flow valving arrangement to operate in the simple cycle mode of operation or the combined-cycle mode of operation, wherein the steam flow valving arrangement is configured to fully stop the flow of steam generated in the HRSG from entering the steam turbine system and to direct all of the flow of steam from the HRSG to the condenser in the simple cycle mode of operation, and wherein the steam flow valving arrangement is configured to fully stop the flow of steam generated in the HRSG from going to the condenser and to direct all of the flow of steam from the HRSG to the steam turbine system in the combined-cycle mode of operation.

14. The method of claim 13, further comprising specifying the position of the at least one valve in the steam flow valving arrangement to permit a first partial flow of steam from the HRSG to the condenser and a second partial flow of steam from the HRSG to the steam turbine system as the power plant transitions between a full combined-cycle mode of operation in which a full flow of steam generated in the HRSG is directed to the steam turbine system without any diversion to the condenser and a full simple cycle mode of operation in which the full flow of steam generated from the HRSG is directed to the condenser bypassing the steam turbine system.

* * * * *